United States Patent [19]

Walcher

[11] 4,367,780
[45] Jan. 11, 1983

[54] CLOSURE MEMBER FOR VEHICLES

[75] Inventor: Wilhelm Walcher, Ulm/Donau, Fed. Rep. of Germany

[73] Assignee: Karl Kässbohrer Fahrzeugwerke GmbH, Ulm, Fed. Rep. of Germany

[21] Appl. No.: 183,895

[22] Filed: Sep. 4, 1980

[30] Foreign Application Priority Data

Sep. 6, 1979 [DE] Fed. Rep. of Germany ....... 2936049

[51] Int. Cl.³ ............................................ E05D 15/00
[52] U.S. Cl. ................................. 160/213; 160/188
[58] Field of Search .............. 160/97, 188, 189, 190, 160/191, 192, 207, 210, 211, 212, 213; 49/379, 386

[56] References Cited

U.S. PATENT DOCUMENTS

| 1,453,550 | 5/1923 | Fogal | 160/188 |
| 2,057,555 | 10/1936 | Clark et al. | 160/210 |
| 2,220,766 | 11/1940 | Hubbs | 49/386 |
| 2,334,749 | 11/1943 | Burr | 160/192 |
| 2,743,773 | 5/1956 | Weiertz | 160/213 |
| 2,788,067 | 4/1957 | Pawlak | 160/97 |
| 2,897,887 | 8/1959 | Miller et al. | 160/97 |
| 3,071,184 | 1/1963 | Peel | 160/213 |
| 3,298,423 | 1/1967 | Carter | 160/97 |
| 3,698,464 | 10/1972 | Scheitel | 160/207 |
| 3,718,171 | 2/1973 | Godwin | 160/188 |

Primary Examiner—Peter M. Caun
Attorney, Agent, or Firm—Blanchard, Flynn, Thiel, Boutell & Tanis

[57] ABSTRACT

A closure member for vehicle compartment openings is pivotally connected along its upper edge to the vehicle by a horizontal swivel axis and is horizontally divided into an upper and a lower closure member part, which parts are pivotally connected to each other along a horizontal connecting axis. A secondary pressure spring extends between the upper and lower closure member parts for effecting relative pivotal movement therebetween toward an intermediate position in which the closure member parts are substantially perpendicular. A lock secures the upper closure member part to the vehicle until the lower closure member part reaches the intermediate position. A main pressure spring extends between the vehicle and the upper closure member part for pivoting the closure member after release of the lock into an end position exposing the compartment opening.

10 Claims, 6 Drawing Figures

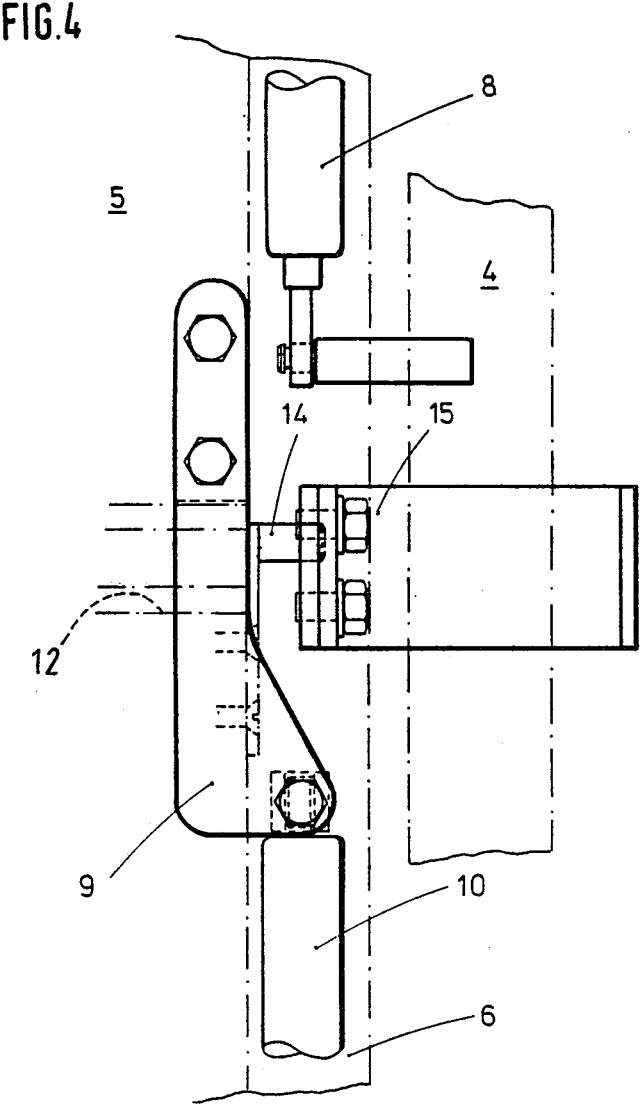

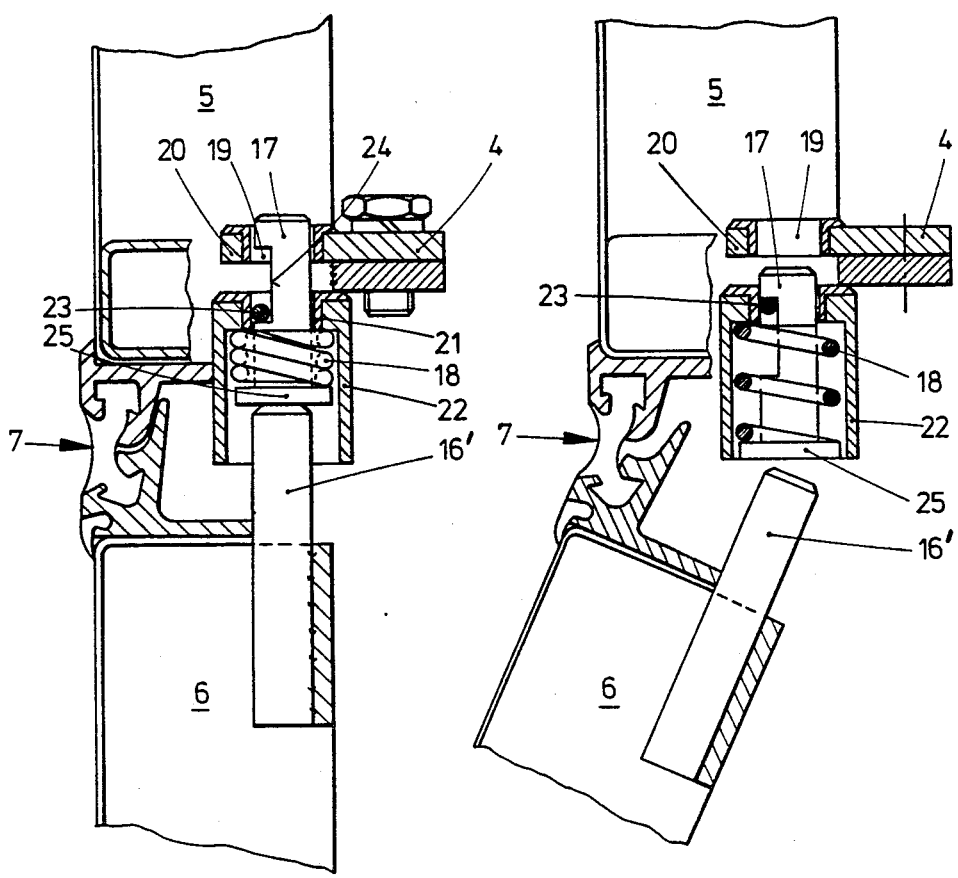

CLOSURE MEMBER FOR VEHICLES

FIELD OF THE INVENTION

The invention relates to a closure member for compartment openings of vehicles such as busses and, more particularly, to a closure member for vehicles having a swivel axis which is located at the upper closure member edge and is substantially horizontal and having at least one pressure spring which is hinged to the vehicle frame and the closure member for opening and holding open the closure member in its upwardly swung end position, which position exposes the compartment opening.

BACKGROUND OF THE INVENTION

Closure members of this type are known in practice. They are usually mounted on the outside of the vehicle and permit access to the baggage compartment. They are also used as service closure members to permit free access to the vehicle's engine.

Several types of pressure springs can be used with the closure member, for example steel springs or gas springs. These pressure springs help, after release of the latch securing the closure member to the vehicle, to swing the closure member upwardly into the end position and to hold it there.

A problem is created by tall closure members, since they require a relatively large space for the upward swing, which space often does not exist when vehicles are closely parked side-by-side.

The invention therefore has as a purpose the provision of an easily manufacturable and easily serviceable closure member of the above-mentioned type which can be used for tall closure member openings.

SUMMARY OF THE INVENTION

This purpose is attained by a closure member which is divided horizontally so that, viewed in the closed position, it has an upper and a lower closure member part which are connected to each other through a substantially horizontal connecting axis and which has a main pressure spring hinged to the upper closure member part and to the vehicle body and at least one secondary pressure spring extending between the two closure member parts. The secondary pressure spring is used during opening of the closure member, the upper closure member part being initially held by a lock, for swinging up the lower closure member part about the connecting axis into an intermediate position which is defined by a stop between the two closure member parts. When the lower closure member part reaches the intermediate position the upper closure member part is released by the lock and can also be swung out, so that then the main pressure spring serves to swing both closure member parts about the swivel axis into the end position.

The inventive closure member has a simple construction. The horizontal division permits, during opening of the closure member, the lower closure member part to first be swung upwardly into the intermediate position. When the compartment opening is relatively tall, this position of the closure member may in some cases be sufficient for access to the opening. If not sufficient, the closure member can, as a whole, then be swung up into its end position. In this latter case, the two closure member parts are swung upwardly about the swivel axis together in a position in which they are angled relative to one another. Since the lower closure member part is already angled relative to the upper closure member part, the radius of swing is considerably reduced as compared with a conventional arrangement which is not angled.

The two pressure springs provide a simple opening linkage which, in addition, makes the inventive closure member serviceable. A lock is provided for the upper closure member part which, during opening of the closure member, only permits the lower closure member part to initially swing out. This lock can be designed in many ways and it can advantageously be released, or its release can be initiated, by the swinging of the lower closure member part into the intermediate position.

The lower closure member part can be swung upwardly, without any substantial movement of the upper closure member, into the intermediate position, which position is limited by a stop and at which position access to a portion of the compartment opening is possible. The lower closure member reaches this intermediate position as a result of the force which is applied by the secondary pressure spring. If the main pressure spring which is associated with the upper closure member part is hinged to the vehicle body like a toggle lever and is, in the closed position of the upper closure member part, in a strong end position in which the upper closure member part is held in the closed position, or if the main pressure spring which is associated with the upper closure member part is, in the closed position of the upper closure member part, in the dead center of a toggle-lever arrangement, the swing momentum of the lower closure member part which develops during opening can, upon reaching the angled intermediate position, be used to open and tilt out the upper closure member part sufficiently far that the main pressure spring which is associated with the upper closure member part passes the dead center of the toggle and urges the upper closure member part in an opening direction, whereby both closure member parts are driven in the angled relationship into the end position.

However, if the main pressure spring which is associated with the upper closure member part is arranged so that it always urges the upper closure member part in an opening direction, even when it is in the closed position, it is advantageous if the lock securing the upper closure member part is designed so that the upper closure member part is only released when the lower closure member part reaches the angled intermediate position. Upon releasing of the lock for the upper closure member part, the main pressure spring which loads the upper closure member part starts immediately to effect the opening of that closure member part and to drive the entire closure member into the end position.

In the case where the momentum of the lower closure member part takes the upper closure member part into its swing and then the main pressure spring swings both closure member parts upwardly in an opening direction, the momentum transfer between the two parts is effected by a stop which is functionally provided between the two closure member parts to limit relative pivotal movement therebetween and which is used for transmitting the momentum from the lower closure member part to the closure member as a whole.

A factor that both of the foregoing constructions have in common is that it is sufficient at a suitable pressure spring adjustment, when opening the closure member, to move the lower closure member part only slightly. The remaining movement of the closure member parts into the end position which exposes the compartment opening then takes place automatically.

In order, during closing of the closure member, to be able to carry out the opening movements in a reverse order, it is advantageous if the secondary pressure spring is harder or stiffer than the main pressure spring. This has the result that, during closing, first the upper closure member part swings in and, subsequently, the lower one.

In consideration of the opening operation and the projection of the closure member in its end position, it is advantageous if the lower closure member part is taller than the upper one. This division provides, for a similar construction of both closure member parts, increased weight to the lower closure member part. The lower closure member part, with its greater mass, is thus able during the opening operation to more easily impart swing momentum to the lighter-weight upper closure member part. In addition, in the end position, the free space which is needed by the angled closure members is smaller, since the taller closure member projects upwardly relative to the projecting upper closure member part.

A further advantageous feature of the invention provides that the lock for the upper closure member part has a bolt which projects laterally from the lower closure member part and is arranged just below the connecting axis, with which bolt is associated a notch on the vehicle body from which the bolt exits when the lower closure member part swings upwardly. This lock is designed simply and it automatically ceases to have effect when the lower closure member part has swung out of the closed position over a certain range of swing. The lock also serves to securely anchor the upper and lower closure member parts in the closed position on the vehicle body in order to secure it against a break-in.

A simple construction of the stop which limits relative pivotal movement between the closure member parts is obtained by manufacturing same as a stroke-limiter in the secondary pressure spring. If the pressure spring is a gas spring, the stop can be manufactured for example as the limit defining the extended position of the gas spring.

In view of the arrangement of the lower closure member part in the intermediate position of the same, which position is defined by the stop, it is advantageous if the lower closure member part, upon reaching the stop, is disposed at approximately a 90° angle with respect to the upper closure member part. This angle permits free access to the compartment opening in cases where the partially opened closure member is sufficient. On the other hand, this angled arrangement is also advantageous for effecting transmission of the swing momentum from the lower closure member part to the upper closure member part during opening of the closure member.

A further feature of the invention provides that the secondary pressure spring has its end which is adjacent the upper closure member part supported at the lower end of a bar which is secured to the upper closure member part and extends downwardly across the connecting axis. The bar provides a simple and secure connection between the two closure member parts. It also serves to secure the vehicle against break-in, since it extends across the connecting axis between the two closure member parts and helps to bind the two closure member parts to one another.

In consideration of the opening operation, it is advantageous if at least the secondary pressure spring is provided in a toggle-lever arrangement with two strong end positions, one of which exists in the closed position and the other in the end position of the closure member. This arrangement holds at least the lower closure member part against the vehicle body in the closed position. During opening of the closure member, the dead-center of the toggle is eventually passed and the pressure springs then automatically swing up the respective closure member parts.

BRIEF DESCRIPTION OF THE DRAWINGS

An exemplary embodiment of the invention will be described hereinafter in connection with drawings, in which:

FIG. 4 is a rear view of the lock and the bar of FIG. 3; and

FIGS. 5 and 6 are side views of an alternative embodiment of the lock of FIG. 3, showing the closure member in closed and partly opened positions, respectively.

DETAILED DESCRIPTION

Figure 1:
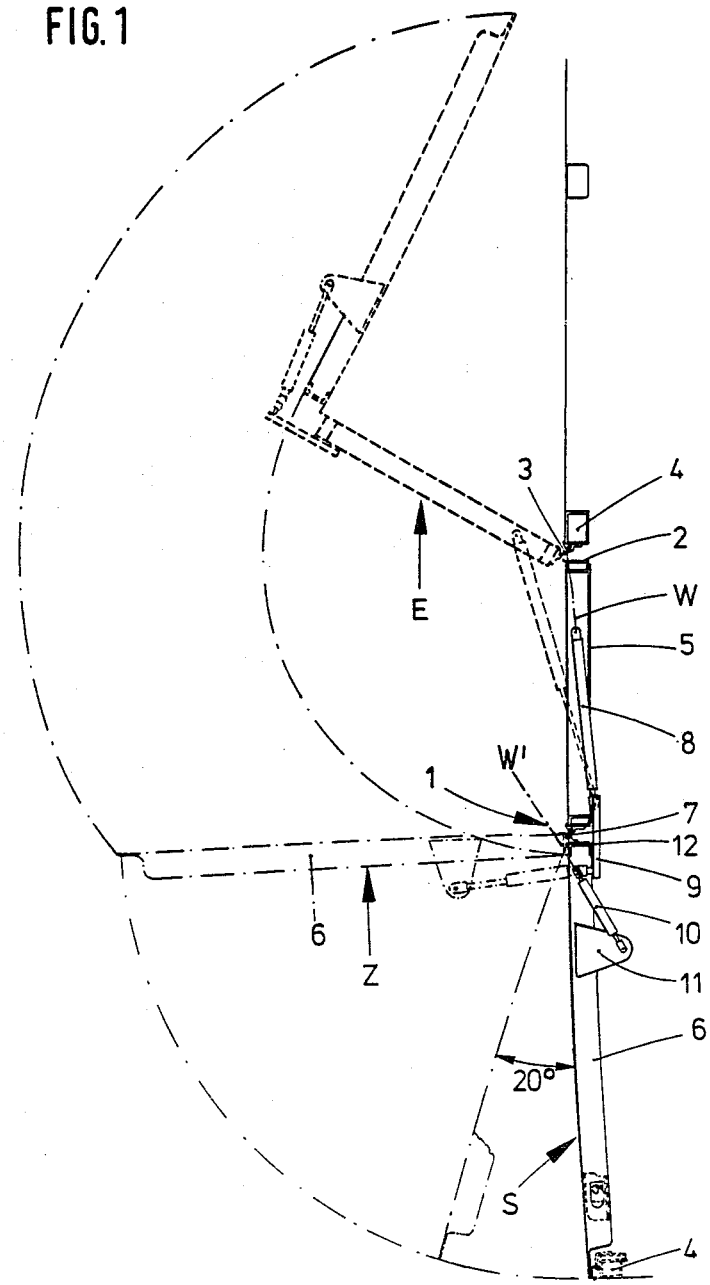
FIG. 1 is a side view of a closure member embodying the present invention.

FIG. 1 illustrates a closure member 1, which in the present case is utilized as a baggage-compartment closure member in vehicles such as busses. It has a horizontal swivel axis 3 at the upper closure member edge 2, which axis is formed by an elongate rubber profile or hinge.

The closure member 1 is illustrated in three positions, namely a closed position S in which it completely covers the compartment opening which exists in the body of the vehicle 4, the end position E, in which it makes the closure member opening accessible over its full height, and an intermediate position Z which is defined by a stop, the positions E and Z being illustrated by broken lines.

The closure member 1 is horizontally divided and has, viewed in the closed position, an upper closure member part 5 and a lower closure member part 6. The parts 5 and 6 are connected with one another through a substantially horizontal connecting axis 7. The axis 7 is manufactured, like the swivel axis 3, as a rubber profile. The upper closure member part 5 is thus located between the connecting axis 7 and the swivel axis 3.

Two main pressure springs 8 are associated in the present case with the upper closure member part 5, which pressure springs 8 are each pivotally hinged at their lower ends to the body 4 and at their upper ends to the closure member part 5. The two main pressure springs 8 are symmetrically arranged on the left and right sides of the closure member part 5. They are preferably gas springs and are arranged so that, when the upper closure member part is in the closed position, they are in the dead center of a toggle-lever arrangement. This can clearly be recognized from FIG. 1, where the line of force application W of each main pressure spring 8 is directed at a slight incline with respect to the plane of the closure member part 5 so as to pass through the joint of the swivel axis 3. As a result of the inclined arrangement of the pressure springs 8, a slight deflection of the upper closure member part 5 from its closed position causes some to be loaded immediately by the pressure springs 8 and to be opened automatically. The pressure springs 8 are dimensioned so that they can hold the entire closure member 1 open when the upper closure member part is in the end position E.

A bar 9 (FIGS. 1 and 3) extends from the upper closure member part 5 at each lateral edge of the closure member 1 over the connecting axis 7 downwardly to the lower closure member part 6. The upper end of the bar 9 is secured on the upper closure member part 5. Its lower end serves to pivotally anchor a secondary pressure spring 10, which is hinged pivotally at its other end to a carrier 11 which is connected to the lower closure member part 6. Each secondary pressure spring 10 is arranged so that, in the closed position of the closure member 1, its line of force application W' passes on the outside of the joint of the connecting axis 7, and the lower closure member part 6 is therefore held by the pressure springs 10 in the closed position in abutment against the vehicle body 4. The pressure springs 10 are thus in a strong end position of a toggle-lever arrangement. The dead-center position of this toggle arrangement defines, with respect to the closed position of the closure member 1, an angle of approximately 20°, as is illustrated by dashes in FIG. 1. The other strong end position is the intermediate position Z of the closure member 1 in which the lower closure member part 6 assumes an angle of approximately 90° with respect to the upper closure member part 5.

Figure 3:
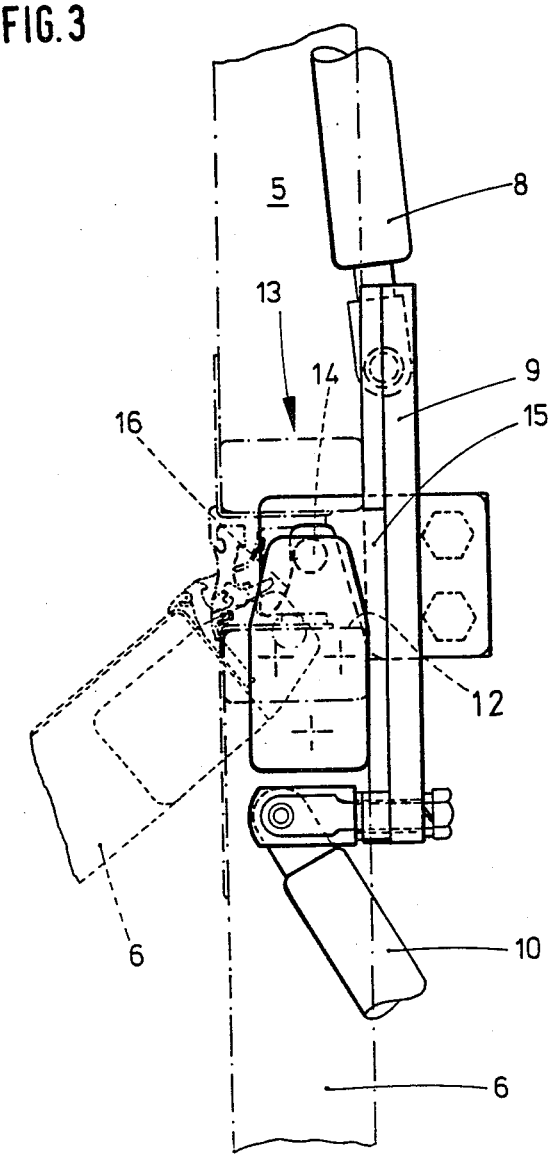
FIG. 3 is a side view illustrating details of a lock and a bar which connects the two closure member parts of FIG. 1.

A lock 13 for the upper closure member part 5 is provided at the upper edge 12 of the lower closure member part 6. It has a bolt 14 provided on each side of the lower closure member part 6 which projects laterally from the closure member part 6 in a direction parallel to the axis of the connecting axis 7. A notched bracket 15 on the vehicle body is associated with each bolt 14 and, during opening of the lower closure member part 6, the bolt swings out of the notch in the bracket 15 along a cam surface 16. FIG. 3 illustrates in dashed lines how, during the swinging up of the lower closure member part 6, the bolt 14 disengages from the notched bracket 15.

The pressure springs 8 and 10, the locks 13 and the bars 9 are arranged symmetrically on both sides of the closure member parts 5 and 6.

Figure 2:
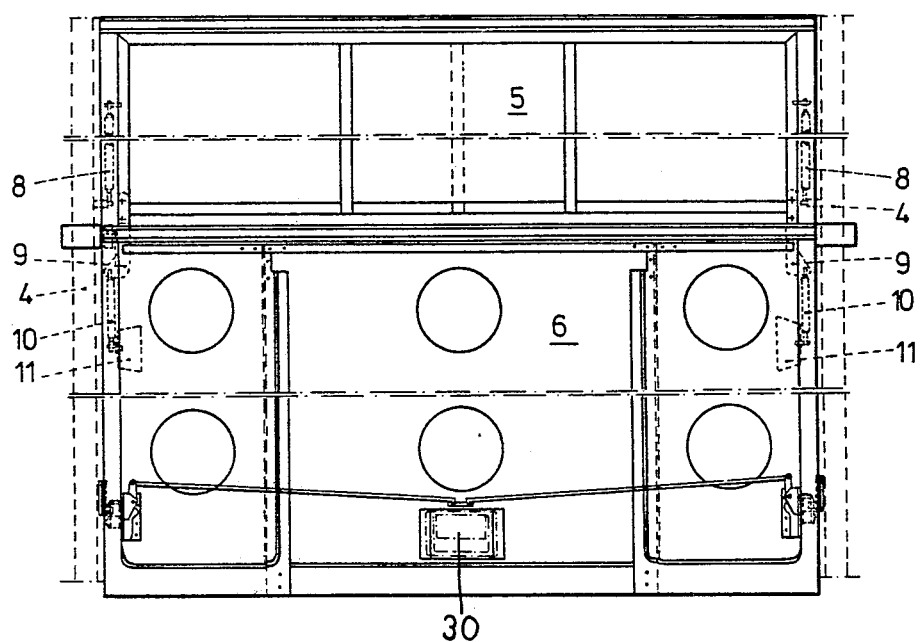
FIG. 2 is a rear view of the closure member of FIG. 1.

FIGS. 1 and 2 show that the lower closure member part 6 is constructed with a greater height than the upper closure member part 5.

The secondary pressure springs 10 are preferably harder or stiffer than the main pressure springs 8. When the secondary pressure springs have reached the intermediate position Z, they rest on a stop (not shown). The stop acts between the two closure member parts 5 and 6 and is, in the present case, defined by the stroke-limiters of the pressure springs 10 which limit the extension stroke of the springs 10.

When opening the closure member 1 it is sufficient to release the latch 30 (FIG. 2) and to swivel the lower closure member part 6 over the dead-center position. The pressure springs 10 then automatically drive the lower closure member part into the intermediate position Z. If this is sufficient, the lower closure member part 6 can be stopped manually in this position. If the entire compartment opening is to be exposed, the lower closure member 6 is permitted to swing unhindered into the intermediate position Z under the force of the pressure springs 10, in which position the stroke-limiters of the pressure springs 10 act as a stop and prevent a further pivotal movement of the lower closure member part 6 relative to the upper closure member part 5. As the lower closure member part 6 is swung upwardly, the bolt 14 moves out of the notch in the bracket 15, after which the upper closure member part 5 is released to be swung upwardly. The momentum generated by the swinging of the lower closure member part 6 about the connecting axis 7 is, upon reaching the intermediate position Z, transmitted to the upper closure member part 5, which causes the two closure member parts 5 and 6 to be driven together about the swivel axis 3 in the angled relationship into the end position E. The momentum which exists upon reaching the intermediate position Z is used to swing out the upper closure member part 5 sufficiently far that each pressure spring 8 leaves its dead-center position and acts automatically to move the two closure members together in the angled relationship into the end position E.

As can be seen from FIG. 1, in spite of the tall compartment opening a relatively small radius of swing is obtained, which radius is only slightly larger than the radius of swing of the lower closure member part 6 around the connecting axis 7. Thus the inventive closure member can be utilized advantageously in vehicles with relatively tall under-floor chambers.

Upon closing the closure member 1, the stiffer pressure springs 10 cause the upper closure member part 5 to first move into its closed position, after which the lower closure member part 6 can swing downwardly into its closed position. The bolts 14 thereby engage the notches in the brackets 15 again and automatically lock the upper closure member part 5 in a closed position.

The bars 9 serve, in addition to the functions described hereinabove, as a break-in lock in case the connecting axis 7 is cut. They prevent either of the two closure member parts 5 and 6 from being pulled outwardly in the area of the connecting axis 7. The locks 13 also contribute to this security feature.

Each main pressure spring 8 is arranged in the illustrated exemplary embodiment so that its line of force application W extends in the closed position through the joint of the swivel axis 3. However, it is also possible to arrange the pressure spring 8 so that its line of force application passes in the closed position on the outside of the joint of the swivel axis 3, for example on the left of the swivel axis 3 in FIG. 1. In the case of such an arrangement of the pressure spring 8, the upper part 5 of the closure member, even when in the closed position, is loaded in an opening direction by the pressure springs 8. During opening of the closure member, the lock 13 initially prevents movement of the upper closure member part 5 until the moment where the lower closure member part 6 has reached the angled intermediate position Z. Then the upper closure member part is released by the lock 13 and, together with the lower closure member part 6, is swung upwardly.

FIGS. 5 and 6 illustrate a lock with an alternative construction. There at least one operating bolt 16' rigidly projects upwardly from the upper edge of the lower closure member part 6. When the closure member 1 is closed, the operating bolt 16' presses a lock element 17 against the force of a spring 18 into the hole 19 of a lock trap 20 which is secured to the vehicle body 4, whereby the upper closure member part 5 is prevented from swinging up. The lock element 17 is longitudinally movable in an opening 21 of a bearing sleeve 22 which is secured to the lower end of the upper closure member part 5. The longitudinal movement of the lock element 17 is limited by a pin 23 which is mounted transversely in the bearing sleeve 22, which pin 23 cooperates with a recess 24 in the lock element 17. The spring 18 is arranged between the bearing sleeve 22 and a collar 25 of the lock element 17 and is initially tensioned so that, upon swinging up of the lower closure member part 6, it presses the lock element 17 out of the lock trap 20 (FIG. 6), whereby the pressure spring 8 can start the pivotal movement of the upper closure member part 5. In the meantime, the lower closure member part 6 has continued its pivotal movement so that, at the end of the opening movements, the two closure member parts 5 and 6 assume the open position E which is illustrated in FIG. 1. The operating bolt 16' and the lock element 17 in the bearing sleeve 22 are advantageously provided at both sides of the closure member parts 5 and 6.

Although a preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a closure member for a compartment opening in a vehicle body, having a swivel axis which is arranged at the closure member's upper edge and is substantially horizontal and having at least one first pressure spring which is hinged between the vehicle body and the closure member for opening and keeping open the closure member in an upwardly swung end position which exposes the compartment opening, the improvement comprising wherein the closure member is horizontally divided and, viewed in a closed position, has upper and lower closure member parts which are connected through a substantially horizontal connecting axis, the first pressure spring being hinged between the upper closure member part and the vehicle body, and including at least one second pressure spring arranged between the two closure member parts, which second pressure spring is used during opening of the lower closure member part, the upper closure member part being initially held by a lock, for swinging up the lower closure member part about the connecting axis into an intermediate position defined by a stop between the two closure member parts, upon the reaching of which intermediate position the upper closure member part is released from the lock and can also be swung out, so that then the first pressure spring swings both the closure member parts about the swivel axis into the end position.

2. The closure member according to claim 1, wherein the second pressure spring is harder than the first one.

3. The closure member according to claims 1 or 2, wherein the lower closure member part is taller than the upper one.

4. The closure member according to claim 1 or 2, wherein the lock has a bolt which projects laterally from the lower closure member part and which is arranged near the connecting axis, with which bolt is associated on the vehicle frame a notched bracket from which the bolt exits during the upward swinging of the lower closure member part.

5. The closure member according to claim 1 or 2, wherein the stop is formed by a stroke-limiter of the second pressure spring.

6. The closure member according to claim 1 or 2, wherein the lower closure member part upon reaching the stop is disposed at approximately a 90° angle with respect to the upper closure member part.

7. The closure member according to claim 1 or 2, wherein the second pressure spring has its end which is associated with the upper closure member part supported on the lower end of a bar which is secured to the upper closure member part and extends downwardly across the connecting axis.

8. The closure member according to claim 1 or 2, wherein at least the second pressure spring is hinged in a toggle-lever arrangement with two stable end positions, one of which exists in the closed position and the other in the open position.

9. The closure member according to claim 8, wherein the dead-center position of the toggle lies at an angle of approximately 20° with respect to the closed position.

10. The closure member according to claim 1 or 2, wherein the lock includes at the lower edge area of the upper closure member a lock element which can be moved approximately perpendicularly with respect to the connecting axis against the force of a spring into a lock trap, with which lock element cooperates an operating bolt which is secured on the lower closure member part.

* * * * *

UNITED STATES PATENT AND TRADEMARK OFFICE
CERTIFICATE OF CORRECTION

PATENT NO. : 4 367 780
DATED : January 11, 1983
INVENTOR(S) : Wilhelm Walcher

It is certified that error appears in the above-identified patent and that said Letters Patent is hereby corrected as shown below:

Col. 8, line 8; change "one" to ---pressure spring---.
Col. 8, line 11; change "one" to ---closure member part---.
Col. 8, line 16; change "frame" to ---body---.
Col. 8, line 37; change "open" to ---upwardly swung end---.
Col. 8, line 43; after "member" insert ---part---.

Signed and Sealed this

Twenty-eighth Day of June 1983

[SEAL]

Attest:

GERALD J. MOSSINGHOFF

Attesting Officer        Commissioner of Patents and Trademarks